United States Patent Office 3,700,417
Patented Oct. 24, 1972

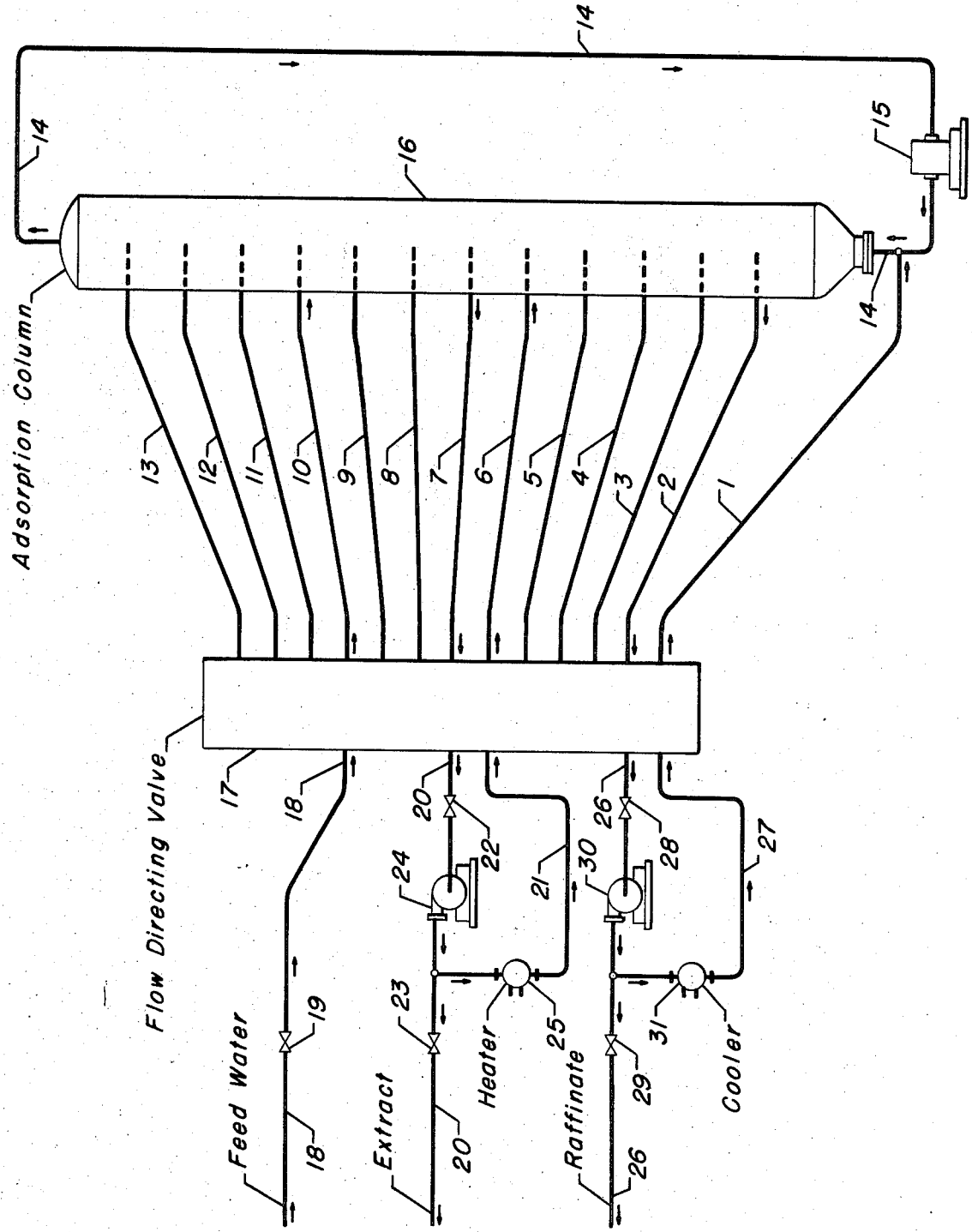

3,700,417
DUAL TEMPERATURE FIXED CARBON BED
HEAVY WATER CONCENTRATION PROCESS
Donald B. Broughton, Evanston, Ill., assignor to Universal Oil Products Company, Des Plaines, Ill.
Filed Nov. 4, 1968, Ser. No. 773,213
Int. Cl. B01d 15/00; C01b 5/02
U.S. Cl. 23—312 W          2 Claims

ABSTRACT OF THE DISCLOSURE

A process for the concentration of a deuterium-containing water stream from a mixture of natural water. A feed stream is contacted with an adsorbent at relatively low temperature conditions to effect adsorption of heavy water by the adsorbent. The heavy water is recovered in a relatively high temperature desorption step. The process is operated in a continuous manner with the general net flow of feed being countercurrent to the adsorbent.

BACKGROUND OF THE INVENTION

Field of the invention

The field of art to which the claimed invention pertains is heavy water concentration. More specifically, the claimed invention relates to the concentration of heavy water from a feed stream of natural water. The concentration process is effected by the adsorption of the heavy water within a selected adsorbent.

Description of the prior art

Deuterium concentration is effected in the following three specific types of separation processes: Electrolysis, distillation and chemical exchange operations. The electrolysis separation processes generally are used for the final concentration of heavy water because of their relatively expensive and high utility requirements. The distillation processes can be used for both final concentration of high purity deuterium-containing streams and initial concentration of deuterium-containing streams. The distillation processes include both water and hydrogen distillation to recover deuterium in both combined water form and hydrogen form. The chemical exchange processes for the separation and concentration of deuterium are primarily used where heavy water is needed. A popular chemical exchange process uses both hydrogen sulfide and water to concentrate a stream of heavy water. The hydrogen sulfide acts as a transport medium for the deuterium. Multiple staging operations affect concentration of deuterium into a final deuterium-rich extract. Common staging operations are used where distillation and the chemical exchange processes are used.

The process of the present invention employs an adsorbent which selectively adsorbs a heavy water enriched stream at a relatively low temperautre. At relatively higher temperatures, the adsorbent employed in the process of this present invention is not as selective towards heavy water concentration as at the relatively lower temperature conditions.

SUMMARY

It is an object of this invention to concentrate heavy water. It is another and more specific object of this invention to selectively adsorb an enriched deuterium stream within an adsorbent. It is another and more sepcific object of this invention to adsorb a relatively enriched deuterium-containing stream at a temperature lower than the temperature at which the enriched adsorbed stream is desorbed. It is another and more specific object of this invention to concentrate deuterium chemically contained in water as HDO through the use of a selected adsorbent which selectively adsorbs the HDO in said water in a selective manner.

Deuterium (D) is the designation for the hydrogen isotope of mass 2. Deuterium is generally found in most naturally occurring substances which contain hydrogen. Deuterium is a stable isotope and occurs in natural hydrogen water and other hydrogen-bearing compounds in an average abundance of 0.015 mol percent. In this specification, heavy water shall mean any water molecule containing deuterium. Examples of heavy water would be deuterium containing water compounds of molecular weight of about 19 (HDO) or about 20 ($D_2O$). These two forms of heavy water are different in that the molecular weight compound containing one deuterium isotope has a molecular weight of 19, whereas the water compound containing two deuterium isotopes has a molecular weight of 20. The deuterium isotope present in molecular weight 20 water is used generally as a moderator for nuclear reactors. Its principal advantage as a moderator lies in its high moderating ratio, which makes possible the operation of the reactor utilizing natural uranium. Deuterium present in molecular weight 20 water has also found extensive use in the field of chemistry, particularly as a tag or tracer in the establishment of reaction kinetics and in rate determining steps in chemical reactions. Deuterium also finds use in military weapons as a constituent for thermal nuclear weapons.

A preferred adsorbent for use in the process of the present invention is activated carbon. Activated carbon can be made from a number of raw materials having a high carbonaceous content. The principal raw materials used in the manufacture of activated carbons are sawdust, coconut shells, black ash, charcoal, lignite, bituminous coal, petroleum coke, etc. These materials are relatively easy to come by, are relatively inexpensive, and generally yield satisfactory activated carbons. Activated carbons can generally be characterized as having high surface area properties. Generally, 450 to 1800 square meters per gram is the range of surface area presented by most activated carbons. Varying surface area requirements can be accomplished in activated carbons by varying the activation treatment of the carbons. The two principal methods for treating carbonaceous materials to produce activated carbon are thermal and chemical activation means. Thermal activation involves heating the raw material to a high temperature in the presence of an oxidizing gas, the most common being steam. Chemical activation consists of heating at an elevated temperature a mixture of the raw material at dehydrating conditions. The raw material is thereby carbonized and activated, the hydration agent is then bleached out and concentrated for reuse. Reference is made to a booklet entitled A Symposium on Activated Carbon, copyright 1968 by Atlas Chemical Industries, Inc., Library of Congress Catalog Card Number: 67–31379 for further information relating to the manufacture and properties of activated carbon. Since adsorption is the result of forces acting at a surface, manufacturing activated carbons for adsorption processes generally involves maximizing the surface area of a given activated charcoal. The adsorbents which can be used in the process of this invention have surface areas within the range of from about 450 to 1800 square meters per gram. The process of this invention employs activated carbons having mesh sizes generally from 20 to 40 mesh (Tyler standard screen measurements).

The activated carbon used in the process of this invention should be present in the granular form. The granular sizes being within the general range of 20 to 40 mesh to allow fluid flow through the bed with reasonable pressure drops and to prevent the loss of activated carbon through attrition and by being carried off by the fluid flowing through the bed.

Exemplary of activated carbons which can be used in the process of this invention are the trade name activated carbons, including Darcoal, Nujar, Nordid, Pittsburg and Columbia.

The enrichment factor or selectivity as used in this specification is the ratio of the concentration of heavy water in the absorbed phase to the concentration of heavy water in the unabsorbed phase. The enrichment factor or selectivity is expressed in equation form as follows:

$$B = \frac{(X)a}{(X)u}$$

wherein "X" represents the concentration in weight parts per million of HDO or $D_2O$, "$a$" represents the absorbed material, "$u$" represents the unadsorbed or external phase material, and "B" represents the enrichment factor or selectivity. Because of the weight differences between HDO and $D_2O$, their weight parts per million (p.p.m.) concentrations may vary. When expressing heavy water concentrations, the type of heavy water (HDO or $D_2O$) being measured is generally given. In natural water, HDO is generally the predominant deuterium-containing water molecule that is present. Enrichment factors or selectivities can be determined by measuring quantitatively the concentration of HDO or $D_2O$ in a water stream for both adsorbed and unadsorbed phases. The selectivity is measured at equilibrium conditions which are defined as the conditions where no net transfer of deuterium (as HDO or $D_2O$) is taking place between an adsorbed phase on an adsorbent and an external or unadsorbed phase in contact with the adsorbent. After an equilibrium condition has been achieved, the unadsorbed phase can be measured for heavy water concentration, the adsorbed phase can then be removed from the adsorbent and in a similar manner measured for deuterium concentration. The ratios of the deuterium concentrations for the adsorbed and unadsorbed phases are then used in the aforementioned equation to determine the selectivity or enrichment factor for the adsorbent.

It has been found that at equilibrium conditions, the adsorbent used in the process of this invention selectively adsorbs heavy water from a feed stream containing heavy water. Selectivity or enrichment factors for HDO concentration were found to be approximately 1.68 at 86° F. and 1.18 at 212° F. Thus, it can readily be seen that the process of this invention should be operated at conditions in which the adsorption of heavy water (as HDO) from a feed stream takes place at a relatively lower temperature than when desorption operations take place.

DETAILED DESCRIPTION OF THE DRAWING

Reference is made to the attached drawing which in most general terms represents the process flow of the process of this invention. Adsorption column 16 contains a series of adjacent masses of adsorbent which are located between the portion of column 16 where line 14 enters the column to the portion of the column where line 14 leaves the column. The adjacent series of adsorbent masses can be individual beds located between lines 1 and 2, 2 and 3, 3 and 4, 4 and 5, 5 and 6, 6 and 7, 7 and 8, 8 and 9, 9 and 10, 10 and 11, 11 and 12, 12 and 13, and 13 and 1 or can be individual and separate vessels with lines 1 through 13 connected to lines connecting the individual vessels together. The adsorption column 16 can have adsorbent in essentially one bed with lines 1 through 13 connected to the continuous single bed of adsorbent.

As represented in the attached drawing, there are thirteen lines attached to adsorption column 16. Any number of lines greater than five may be used in the process of this invention. The use of a large number of adsorbent beds, or a large number of individual adsorbent vessels can effect an improved heavy water concentration.

When referred to herein, the terms "upstream" and "downstream" are to be interpreted in their ordinary and usual definition in the chemical process arts. The term "downstream" refers to an advanced point in the direction of net fluid flow through the adsorption column 16 or the adjacent masses of adsorbent relative to a point of reference of a particular mass of adsorbent. The term "upstream" refers to a point in the opposite direction of net fluid flow through the adsorption column 16 relative to a point of reference of a particular mass of adsorbent.

Line 14, which is the fluid circulation line, continuously transfers fluid from the top of column 16 to the bottom of column 16 via the circulation means 15 in line 14. Circulation means 15 can be a pump or a compressor, depending on the type of fluid (gaseous or liquid) passing through line 14. The function of circulation line 14 is to effect a continuous net fluid flow in one direction through the adsorbent in column 16. The composition of the fluid flowing through circulation line 14 is constantly undergoing a change as material flowing into and out of the adsorption column 16 via lines 1 through 13 is advanced in a downstream direction through lines 1 through 13. The rate of fluid circulation through line 14 changes because the fluid flow requirements through the column change as the composition of fluid flowing through the adsorbent changes.

Lines 1 through 13 are the lines through which material flows into the column 16 and out of the column 16 and can be considered as flow conduits. The thirteen flow conduits connect the column 16 to flow directing valve 17. Flow directing valve 17 connects the thirteen flow conduits which are connected to the column 16 to lines 18, 20, 21, 26 and 27. Lines 18, 20 and 26 respectively carry feed water, heavy water rich extract and heavy water depleted raffinate streams. In the process of this invention, heavy water present in a water feed stream is adsorbed in an adsorption zone at a relatively low temperature and adsorbed heavy water present in an adsorbent is desorbed in a desorption zone at a relatively high temperature. It can be seen that in a continuously operated process where the adsorbent is in continuous use, that a means of heating and cooling the solid adsorbent is required in order to allow both adsorption and desorption to take place. In the process of this invention, the heating and cooling of adsorbent is accomplished by commingling a fluid with the adsorbent. This method is quite efficient as high heat transfer coefficients are attained between the fluid and the adsorbent.

In order to maintain a continuously operated heavy water concentration process, it is essential that both adsorption and desorption of heavy water be continuously taking place. The continuous production of a heavy water rich extract stream is effected by simultaneously operating adsorption and desorption zones at separate locations in the series of adjacent adsorbent masses and periodically advancing the adsorption and desorption zones, equidistantly and in a downstream direction through the series of adjacent adsorbent masses. Flow directing valve 17 is used to advance the chemical adsorption and desorption zones through adsorption column 16 by periodically shifting the feed, extract and raffinate streams which flow through flow conduits 1 through 13.

Adsorption column 16 as shown by the attached drawing has feed flowing through line 18, at a rate controlled by valve 19 in line 18, into flow directing valve 17. Flow directing valve 17 directs the feed through flow conduit 10 into adsorbent in adsorption column 16. A heavy water rich extract stream flows out of column 16 through flow conduit 7 to flow directing valve 17 wherein the extract stream is directed to line 20 and flows out through line 20 at a rate controlled by valve 23 in line 20. Recycle means 24 circulates a portion of the extract stream removed from column 16 through line 20 back to the column 16 via flow directing valve 17 which connects lines 21 and 6. The extract flowing back to column 16 through line 6 is heated by external heating means which is represented by heat exchanger 25 in line 21. The extract stream returning to column 16 after passing through heat exchanger 25 is relatively hot when compared to the extract flowing through line 20. The hot extract flowing through flow conduit 6 into column 16 heats the adsorbent present in the proximate vicinity of where the hot extract enters the column.

During the normal operations of the process of this invention, feed, cool extract, hot extract, hot raffinate and cool raffinate streams flow through flow conduits 1 through 13 as directed by flow directing valve 17 as indicated in Table I for a predetermined period of time. After a certain period of time, the flow directing valve 17 shifts the feed, cool extract, hot extract, hot raffinate and cool raffinate streams to their next respective downstream flow conduit where the streams are maintained for a certain period of time before again shifting to the next downstream flow conduit. In order to maintain continuous operations, the feed stream after flowing through flow conduit 13 is shifted to line 1 by flow directing valve 17. The cool extract, hot extract, hot raffinate and cool raffinate streams similarly are shifted to line 1 after flowing through line 13. During the normal cyclic process operations, the feed, cool extract, hot extract, hot raffinate and cool raffinate streams maintain the same spatial arrangement as they are shifted in a downstream direction by flow directing valve 17. Table II below indicates the programmed pattern in which flow directing valve 17 advances the streams entering and leaving column 16 through flow conduits 1 through 13 via flow directing valve 17.

TABLE II

| Flow conduit number | Cycle number | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | [1]13 |
| 13 | | | | | F | | | CE | HE | | | | HR | CR |
| 12 | | | | F | | | CE | HE | | | | HR | CR | |
| 11 | | | F | | | CE | HE | | | | HR | CR | | |
| 10 | F[1] | | | | CE | HE | | | | HR | CR | | | |
| 9 | | | CE | HE | | | | HR | CR | | | | | |
| 8 | | CE | HE | | | | HR | CR | | | | F | | |
| 7 | CE[3] | HE | | | | HR | CR | | | | F | | | |
| 6 | HE[4] | | | | HR | CR | | | | F | | | CE | |
| 5 | | | | HR | CR | | | | F | | | CE | HE | |
| 4 | | | HR | CR | | | | F | | | CE | HE | | |
| 3 | | HR | CR | | | | F | | | CE | HE | | | |
| 2 | HR[5] | CR | | | | F | | | CE | HE | | | | |
| 1 | CR[6] | | | | F | | | CE | HE | | | | | HR |

[1] CR, F, CE, HE and HR lines are shifted to the lines indicated for cycle I.
[2] Feed, flowing into column 16.
[3] Cool extract, flowing out of column 16.
[4] Hot extract, flowing into column 16.
[5] Hot raffinate, flowing out of column 16.
[6] Cool raffinate, flowing into column 16.

NOTE.—Blank spaces indicate flow conduits having no net fluid flow therein.

Line 26 carries the heavy water depleted raffinate stream from column 16 via flow conduit 2 and flow-directing valve 17. Valve 29 in line 26 controls the rate of flow of raffinate material out of the process. Recycle means 30 in line 26 circulates a portion of the raffinate withdrawn from column 16 via line 2 through line 27 which is connected to line 1 through flow directing valve 17. Line 27 has external cooling means 31 which is a heat exchanger which cools the raffinate flowing through line 27. The cool raffinate flowing into column 16 via flow conduit 1 cools the adsorbent that it contacts in the column 16.

The present flow as indicated by the attached drawing is shown in Table I.

TABLE I

| Line No. | Direction of fluid flow | Composition of fluid |
|---|---|---|
| 18 | Into column 16 | Feed. |
| 20 | Out of column 16 | Cool extract. |
| 21 | Into column 16 | Hot extract. |
| 26 | Out of column 16 | Hot raffinate. |
| 27 | Into column 16 | Cool raffinate. |
| 13 | Stagnant* | |
| 12 | Stagnant | |
| 11 | do | |
| 10 | Into column 16 | Feed. |
| 9 | Stagnant | |
| 8 | do | |
| 7 | Out of column 16 | Cool extract. |
| 6 | Into column 16 | Hot extract. |
| 5 | Stagnant | |
| 4 | do | |
| 3 | do | |
| 2 | Out of column 16 | Hot raffinate. |
| 1 | Into column 16 | Cool raffinate. |

*Stagnant indicates no net flow through these lines.

The detailed fluid flow through column 16 can be visualized by labeling the adsorbent located between the feed stream inlet to column 16 downstream to the cool raffinate inlet stream to column 16, as an absorption zone; the absorbent located between the cool raffinate stream flowing into column 16, downstream to the hot raffinate stream flowing out of column 16 as a solids cooling zone, the adsorbent located between the hot raffinate stream flowing out of column 16, downstream to the hot extract stream flowing into column 16 as a desorption zone, the adsorbent located between the cool extract stream flowing out of column 16 downstream to the feed stream flowing into column 16 as an enrichment zone and the adsorbent located between the hot extract inlet stream downstream to the cool extract outlet as the solids-heating zone. The adsorption zone, solids cooling zone, desorption zone, solids heating zone and enrichment zone are shifted in a downstream direction as the inlet and/or outlet streams that define their boundaries are also shifted during the various cycles as indicated in Table II above. The five aforementioned zones are in continuous operation during normal operations of the process of this invention giving a simulated countercurrent moving bed operation as the individual zones are shifted in a downstream direction through the adjacent masses of absorbent.

A description of the physical operations taking place in the aforementioned five zones is given as follows:

ABSORPTION ZONE

In this zone, the primary operation taking place is the physical absorption of heavy water by the activated carbon absorbent. Feed water enters the absorption zone through its upstream boundary while a heavy water depleted raffinate stream is withdrawn from the absorption zone through its farthest downstream boundary. Since the absorption zone, along with the other four zones, moves in a downstream direction through the adjacent masses of adsorbent, adsorbent passes into the adsorption zone through this zone's farthest downstream boundary and passes through the zone towards the farthest upstream boundary (feed stream) and leaves the adsorption zone therefrom. The adsorbent entering the adsorption zone is considered to be depleted in heavy water. As the heavy water-depleted adsorbent passes through the adsorption zone it adsorbs an increasing amount of heavy water. The adsorbent leaving the adsorption zone is referred to as a rich adsorbent and contains adsorbed heavy water and raffinate material entrained by the adsorbent. The solids entering the adsorption zone are relatively cool, having been previously cooled in the solids cooling zone during a previous cycle of operations.

ENRICHMENT ZONE

The enrichment zone is immediately upstream from the adsorption zone. The rich adsorbent withdrawn from the adsorption zone passes directly into the enrichment zone through the farthest downstream boundary of the enrichment zone. The purpose of the enrichment zone is to further enrich the adsorbent with heavy water. A quantity of cool extract material flows through the enrichment zone's farthest upstream boundary. This cool extract stream contacts the adsorbent in the enrichment zone allowing a further adsorption of heavy water onto the adsorbent and the displacement, by the cool extract, of any raffinate material entrained by the solid activated carbon adsorbent. In the enrichment zone, as in the four other zones, the adsorbent, relative to the enrichment zone, moves from the farthest downstream boundary towards the farthest upstream boundary of the enrichment zone. The adsorbent in moving through the enrichment zone towards the solids heating zone becomes enriched in heavy water as it contacts a fluid stream containing increasing amounts of heavy water. The material withdrawn from the enrichment zone through its farthest downstream boundary comprises a raffinate material which previously had been entrained within the adsorbent.

SOLIDS-HEATING ZONE

The primary operation taking place in this zone is the heating of the enriched adsorbent by contacting the enriched adsorbent with a hot extract stream. The hot extract stream comprises a stream containing a relatively high concentration of heavy water. As previously mentioned, the boundaries of the solids-heating zone are the hot extract inlet stream and the cool extract outlet stream. A portion of the cool extract stream removed from the solids-heating zone is removed from the process via line 20. The remaining cool extract withdrawn from adsorption column 16 via flow directing valve 17 is recirculated to the column after passing through an external heating means. The external heating means gives a hot extract stream which heats the adsorbent contained in the solids heating zone. The excellent heat transfer coefficient between fluid and finely divided solids present in the solids-heating zone insures efficient heat transfer in the mass of adsorbent. The adsorbent, after being heated in the solids-heating zone, has a low selectivity or tenacity for holding heavy water at a higher temperature. A relatively hot enriched adsorbent withdrawn from the solids-heating zone is passed directly into the next upstream zone wherein heavy water is desorbed from the relatively hot enriched adsorbent by contact with a stream containing a lesser amount of heavy water than the cool extract stream.

DESORPTION ZONE

The desorption zone which is the next upstream zone located from the solids-heating zone effects the transfer of heavy water previously adsorbed on the adsorbent to an external fluid phase by physical desorption. A relatively hot enriched adsorbent is passed into the desorption zone through its farthest downstream boundary and a relatively hot heavy water-depleted adsorbent is withdrawn from the desorption zone through its farthest upstream boundary. A heavy water-depleted raffinate stream passes into the desorption zone through its farthest upstream boundary to effect the transfer of heavy water absorbed on the relatively hot enriched adsorbent to the fluid phase.

SOLIDS-COOLING ZONE

The relatively hot heavy water-depleted adsorbent withdrawn from the desorption zone passes into the solids-cooling zone through the farthest downstream boundary of this zone. The adsorbent entering the solids-cooling zone is contacted with a circulating stream of raffinate material which is cooled by an external cooling means. The relatively hot raffinate stream which is withdrawn from the solids-cooling zone through its farthest downstream boundary passes out of the adsorption column through line 26 with a portion of the relatively hot raffinate stream being recirculated via line 27 and the external cooling means to the solids-cooling zone through the solids-cooling zone's farthest upstream boundary. The solid adsorbent withdrawn from the solids-cooling zone then passes into the adsorption zone wherein the preferential adsorption of heavy water takes place at the preferred relatively low temperature.

The heating and cooling loads in the solids-heating and solids-cooling zones are substantially equal. The external heating means, heat-exchanger 25, and the external cooling means, heat-exchanger 31, can be connected in a manner so that the heat recovered by the external cooling means can be used as a supply of heat source to the external heating means.

Table III below shows the type of adsorbent entering and leaving each one of the five respective zones. In addition, Table III shows the various fluid streams entering and leaving the five zones.

TABLE III

| Zone description | Solid adsorbent description | | Fluid description | | Zone boundaries | |
| --- | --- | --- | --- | --- | --- | --- |
| | Entering zone | Leaving zone | Entering zone | Leaving zone | Upstream boundary | Downstream boundary |
| Adsorption zone | Cool heavy water-depleted adsorbent. | Cool rich adsorbent. | Feed plus raffinate from enrichment zone. | Raffinate. | Feed stream inlet. | Cool raffinate inlet. |
| Enrichment zone | Cool rich adsorbent. | Enriched adsorbent. | Cool extract. | do. | Cool extract outlet. | Feed stream inlet. |
| Solids-heating zone | Enriched adsorbent. | Hot enriched adsorbent. | Hot extract plus extract from desorption zone. | Cool extract. | Hot extract inlet. | Cool extract outlet. |
| Desorption zone | Hot enriched adsorbent. | Hot heavy water-depleted adsorbent. | Hot raffinate. | Extract. | Hot raffinate outlet. | Hot extract inlet. |
| Solids-cooling zone | Hot heavy water-depleted adsorbent. | Cool heavy water-depleted adsorbent. | Cool raffinate plus raffinate from adsorption zone. | Hot raffinate. | Cool raffinate inlet. | Hot raffinate outlet. |

During all of the various cycles of Table II, the circulating means 15 in circulation line 14 maintains a net fluid flow to the adsorbent in column 16, from conduit 1 to flow conduit 13 past the intermediate flow conduits 2 through 12. The continuous net flow of fluid through the adsorbent and the continuous shifting of the adsorption, enrichment, solids-heating, desorption and solids-cooling zones allows a continuous production of a heavy water extract stream.

In this specification, feed shall refer to a natural water stream containing heavy water which flows into the adjacent masses of adsorbent through line 18 via flow directing valve 17. The cool extract and hot extract streams in this specification shall refer to streams of water containing heavy water in a concentration greater than the concentration of the heavy water in the feed. The differentiation between hot extract and cool extract streams generally refers to the temperature differences of these streams and not to a difference in heavy water concentration. The extract product withdrawn from this process refers to the cool extract. The cool and hot raffinate streams shall refer to water streams containing heavy water concentration less than the value of the heavy water concentration in the feed. Both the hot and cool raffinate streams are substantially identical in heavy water concentration with their distinguishing feature being their individual stream temperatures. The hot raffinate stream refers to the raffinate stream withdrawn from the process of this invention.

In cycle 1 of Table II, the feed stream enters the adsorbent in column 16 through flow conduit 10 and flows into the adsorption zone hereinbefore defined as the adsorbent located between the feed inlet stream and the cool raffinate inlet stream. The net flow of fluid through column 16 being in a downstream direction, that is, from the solids-cooling zone towards the adsorption zone through the intermediate zones of desorption solids-heating and enrichment. The net flow of fluid through column 16 forces the feed that enters the column through flow conduit 10 into the adsorption zone. In addition to the feed entering the adsorption zone, raffinate material from the enrichment zone which is immediately upstream from the adsorption zone also flows into the adsorption zone. The heavy water present in the feed flowing into the adsorption zone is adsorbed on the activated carbon. The remaining feed material which contains a lower amount of heavy water than the feed material fed to the adsorption zone (raffinate material) passes out of the adsorption zone. The fluid passing into the adsorption zone, that is, feed plus raffinate material from the enrichment zone, forces raffinate material to flow out of the adsorption zone and into its next downstream adjacent zone, the solids cooling zone.

Immediately upstream from the adsorption zone is the enrichment zone. The adsorbent material in the enrichment zone contains adsorbed heavy water from a previous cycle of operations. In order to eliminate most of the raffinate material contained within the interstitial voids of the solid adsorbent and the raffinate material which is adsorbed by the solid adsorbent, a small amount of cool extract material is passed into the enrichment zone to displace raffinate material from between the adsorbent interstitial voids and from within the adsorbent. This displaced raffinate material comprises the material that flows into the adsorption zone in admixture with the feed.

The adsorbent present in the solids heating zone has previously been contacted with material in the adsorption zone and enrichment zone respectively. The solid adsorbent in the solids heating zone is heated by intimate contact with a hot extract stream in order to alter the adsorbent's selectivity for heavy water and to allow desorption of heavy water from the adsorbent. The desorption of heavy water from the solid adsorbent takes place in the desorption zone at an elevated temperature. In the desorption zone, the hot enriched adsorbent contacts a hot raffinate stream which causes the heavy water which had previously been adsorbed by the adsorbent to be desorbed or replaced by the raffinate material. The fluid leaving the desorption zone comprises extract material which has been displaced from the desorbent in the desorption zone by raffinate material which flows into the desorption zone. The adsorbent which leaves the desorption zone is depleted in heavy water and passes into the solids-cooling zone. The adsorbent present in the solids-cooling zone has previously been in contact with material present in the adsorption zone, the enrichment zone, the solids-heating zone, and the desorption zone. In the solids-cooling zone, the adsorbent contacts a raffinate mixture which cools the adsorbent so that it may be at a suitable temperature for passage into the adsorption zone.

The type of material present in any one of the five aforementioned zones remains fixed during the operations of the various cycles as shown in Table II. In order for this condition to be possible, the rate of fluid circulation through the adjacent masses of adsorbent via circulation means 15 must be programmed to be consistent with the systematic shifting of the adsorption zone, enrichment zone, solids-heating zone, desorption zone and the solids-cooling zone. By maintaining precise control over both the shifting of the flow conduits as seen in Table II, and the rate of material circulated through the column via circulation line 14, a zone can be shifted throughout the entire adjacent masses of adsorbent with no appreciable change in the overall composition in the fluid present in that zone. The individual zones being shifted through the adjacent masses of adsorbent and with the individual zones having constant compositions of fluid therein, a true countercurrent continuous flow process is thereby achieved.

The advantages achieved by using a fixed-bed of adsorbent and shifting the individual zones through that bed of adsorbent reside primarily in the ease of maintaining a uniform plugwise flow of fluid through the entire cross section of the adsorbent. Another benefit achieved by using a fixed-bed countercurrent flow system is the lack of attrition of the adsorbent since the adsorbent remains fixed and does not physically move through the column.

In the process of this invention, because of the relatively low concentrations of heavy water present in a feed stream to column 16, a large requirement of adsorbent is needed in the desorption zone. This high requirement is due primarily to the fact that the hot enriched adsorbent which passed into the desorption zone is contacted with a raffinate stream to desorb the selectively adsorbed heavy water from the adsorbent. In order to maintain an extract stream high in heavy water purity a high tray requirement is needed in this zone. The theoretical tray requirements for the desorption zone can be as much as 80 times the theoretical requirements of the adsorption zone.

Adsorption conditions are included within the temperature range of from about 40° F. to about 200° F. and the pressure range of from about atmospheric to about 500 p.s.i.g. Desorption conditions are included within the temperature range of from about 150° F. to about 400° F. and the pressure range of from about atmospheric to about 500 p.s.i.g. Both liquid and vapor phase operations are contemplated in the process of this invention.

It is preferred to operate the adsorption zone at an average temperature at least 100° F. below the average temperature of the desorption zone to advantageously use the effects of temperature on the selectivity of the adsorbent for heavy water separation.

The process of this invention is further illustrated in the following example for concentrating a deuterium extract stream from a tap water stream.

EXAMPLE

The adsorbent column used in this example contained twenty-four serially connected beds having about 10,400 lbs. of 20–40 mesh granular activated carbon and having a surface area in excess of about 450 m.²/gm. in each bed. The individual beds were all about ten feet in diameter and approximately four feet in length and were serially connected in an end to end fashion. The two terminal beds were connected via a circulation line as previously described. The upstream and downstream boundaries of the individual adsorbent bed had flow conduits connected thereto (see Table III). The twenty-four individual flow conduits connected to the series of adsorbent beds comprising the adsorbent column were connected to a flow directing valve similar to the one previously described. Table IV below indicates the distribution of the twenty-four serially connected beds for the five separate zones of operation in this process.

TABLE IV

| Zone description: | Number of beds |
|---|---|
| Adsorption | 3 |
| Enrichment | 3 |
| Solids-heating | 1 |
| Desorption | 16 |
| Solids-cooling | 1 |

The flow directing valve was controlled to maintain a periodic shifting of the five zones of Table IV in a downstream direction. The rate of the shifting of the zones through the adjacent twenty-four adsorbent beds averaged about thirty minutes for one complete cycle of operations, that is the time required for a particular zone to shift through the entire series of twenty-four adsorbent beds and return to its original location was about thirty minutes.

The fresh feed rate into the series of adsorbent beds through the flow directing valve was approximately 4,500 lbs./hours of water having a heavy water content (as HDO) of about 280 p.p.m. by weight. The raffinate withdrawn from the series of adsorbent beds contained about 60 p.p.m. by weight of HDO and was withdrawn at a rate of approximately 4464 lbs./hours. The extract withdrawn from the process contained about 2800 p.p.m. by weight of HDO and was withdrawn at a rate of about 37 lbs./hours. The entire operation was performed in liquid phase with the approximate liquid flow rates in each zone shown in Table V below:

TABLE V

| Zone: | Flow rate of liquid, lb./hr. |
|---|---|
| Adsorption | 511,000 |
| Enrichment | 506,500 |
| Solids-heating [1] | 624,540 |
| Description | 506,540 |
| Solids-cooling [2] | 629,000 |

[1] Of the total liquid flow passing into this zone, approximately 118,000 lbs./hours is hot extract material entering through the flow conduit comprising this zone's upstream boundary.
[2] Of the total of 629,000 lbs./hour of liquid passing into this zone, about 118,000 lbs./hours is cool raffinate material entering through the flow conduit comprising this zone's upstream boundary.

The feed entered the process at an ambient temperature of about 86° F. The cool extract stream withdrawn from the process as product was at approximately the same temperature as the feed stream. The hot extract stream which is recirculated to the solids-heating zone was at about 212° F. and the cool raffinate stream recirculated to the solids-cooling zone was at about 86° F.

From proper control of the liquid circulation rate through the adsorbent beds and of the shifting of the various zones through the adsorbent beds, the adsorbent zone was maintained at about 86° F., while the desorption zone was maintained at about 212° F.

The example used herein is not given to unduly limit the scope of this invention, but is given to be illustrative of a process which functions within the scope of the claimed invention.

DESCRIPTION OF PREFERRED EMBODIMENTS

A broad embodiment of this invention resides in an essentially dual temperature adsorptive-separation process wherein adsorption of heavy water onto the adsorbent is effected at a temperature relatively lower than the temperature at which desorption of heavy water from the adsorbent takes place. Another and more specific embodiment of this invention resides in a continuous flow, countercurrent fluid adsorbent flow process in which there is a continuous production of product extract and raffinate materials. Another embodiment of this invention resides in a process in which an adsorption zone and a desorption zone are separated by intermediate zones with the adsorption, intermediate and desorption zone connected in a continuous head to tail arrangement.

I claim as my invention:

1. A continuous process for the concentration of a heavy water extract stream from a water feed, utilizing a fixed bed of solid granular activated carbon adsorbed capable of selectively adsorbing heavy water, said fixed bed of said adsorbent defining at least 5 serially interconnected zones having fluid flow connecting means between adjacent zones and between the outlet of the last zone and the inlet of the first zone in the series which process comprises:

(a) introducing said water feed containing heavy water into one zone of said fixed bed;

(b) maintaining a continuously circulating stream of water flowing through said series of zones;

(c) introducing a cool raffinate water stream, obtained as hereinafter specified, into another zone of the fixed bed of adsorbent which is downstream relative to the zone to which said feed is introduced;

(d) withdrawing a hot raffinate water stream relatively depleted in heavy water from another zone of the fixed bed of adsorbent which is downstream relative to the zone to which said cool raffinate is introduced;

(e) Cooling a portion of said hot raffinate stream and returning it to step (c) as said cool raffinate;

(f) introducing a hot extract water stream, obtained as hereinafter specified, into another zone of the fixed bed of adsorbent which is downstream relative to the zone from which said hot raffinate stream is withdrawn;

(g) withdrawing a cool extract water stream relatively enriched in heavy water from another zone of the fixed bed of adsorbent which is downstream relative to the zone to which said hot extract stream is introduced and upstream relative to the zone to which said feed is introduced;

(h) heating a portion of said cool extract stream and returning it to step (f) as said hot extract;

(i) each of said steps (a) through (h) being effected simultaneously;

(j) periodically advancing downstream the point of charging said feed while simultaneously and equally advancing downstream the points of introducing said cool raffinate and said hot extract and the points of withdrawing said hot raffinate and said cool extract; and (k) the zone of said bed of absorbent which is bounded by the feed introduction point at its upstream end and by the cool raffinate introduction point at its downstream end is maintained at a first temperature of about 40° to about 200° F., and the zone of said bed of absorbent which is bounded by the hot raffiate withdrawal point at its upstream end and by the hot extract introduction point at its downstream end is maintained at a second temperature of about 150° to about 400° F. and at least 100° F. higher than said first temperature.

2. The process of claim 1 further characterized in being effected at a pressure of from about atmospheric to about 500 p.s.i.g.

References Cited

UNITED STATES PATENTS

| | | | |
|---|---|---|---|
| 2,156,851 | 5/1930 | Hansgirg | 23—204 |
| 2,689,782 | 9/1954 | Murphree | 23—204 |
| 2,690,379 | 9/1954 | Urey | 23—204 |
| 2,690,380 | 9/1954 | Taylor | 23—204 |
| 2,690,381 | 9/1954 | Taylor | 23—210 |
| 2,780,526 | 2/1957 | Fleck | 23—204 X |
| 2,787,526 | 4/1957 | Spevack | 23—204 |
| 2,908,554 | 10/1959 | Hoogschogen | 23—204 |
| 2,927,003 | 3/1960 | Becker | 23—210 X |
| 2,988,428 | 6/1961 | Hesky | 23—204 |

FOREIGN PATENTS

| | | | |
|---|---|---|---|
| 592,366 | 2/1960 | Great Britain | 23—204 |
| 1,121,593 | 1/1962 | Germany | 23—204 |

OTHER REFERENCES

Jacobs: Heavy Water Production, TID-3091/Supp. 1, pp. 3, 5, 6.

NORMAN YUDKOFF, Primary Examiner

S. J. EMERY, Assistant Examiner

U.S. Cl. X.R.

23—204 R; 210—20, 24, 38, 41